United States Patent
Bandlamudi et al.

(10) Patent No.: US 10,505,857 B1
(45) Date of Patent: Dec. 10, 2019

(54) MAXIMIZING NETWORK THROUGHPUT BETWEEN DEDUPLICATION APPLIANCES AND CLOUD COMPUTING NETWORKS

(71) Applicant: EMC IP Holding Company LLC, Hopkinton, MA (US)

(72) Inventors: Venkata Bandlamudi, San Jose, CA (US); Kalyani Sundaralingam, Campbell, CA (US); Nitin Madan, Hopkinton, MA (US); Bhimsen Bhanjois, Fremont, CA (US); Debasish Garai, Cupertino, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 203 days.

(21) Appl. No.: 15/650,087

(22) Filed: Jul. 14, 2017

(51) Int. Cl.
*G06F 15/173* (2006.01)
*H04L 12/873* (2013.01)
*H04L 12/24* (2006.01)
*H04L 12/801* (2013.01)
*H04L 12/26* (2006.01)

(52) U.S. Cl.
CPC ........ *H04L 47/522* (2013.01); *H04L 41/5019* (2013.01); *H04L 47/52* (2013.01); *H04L 41/5041* (2013.01); *H04L 43/0888* (2013.01); *H04L 47/12* (2013.01)

(58) Field of Classification Search
CPC ................................. H04L 47/70; G06F 9/546
USPC ................................................ 709/223, 226
See application file for complete search history.

(56) References Cited

U.S. PATENT DOCUMENTS

| 9,391,865 B1* | 7/2016 | Thiam ..................... H04L 43/10 |
| 2013/0124669 A1* | 5/2013 | Anderson ........... G06F 11/3006 709/217 |

* cited by examiner

*Primary Examiner* — Wing F Chan
*Assistant Examiner* — Andrew Woo
(74) *Attorney, Agent, or Firm* — Staniford Tomita LLP (57) ABSTRACT

A system and method for maximizing network throughput by dynamically tuning the number of connections used during data transfer with various cloud providers. This adaptive tuning of the network connections is based on the accepted request rate for the cloud provider, the outstanding transfer capacity of the cloud network as derived from the network bandwidth, and errors and retry requests from the network and the cloud provider.

8 Claims, 5 Drawing Sheets

MAXIMIZING NETWORK THROUGHPUT BETWEEN DEDUPLICATION APPLIANCES AND CLOUD COMPUTING NETWORKS

TECHNICAL FIELD

This invention relates generally to cloud computing networks, and more particularly to systems and methods for maximizing network throughput in deduplication backup systems.

BACKGROUND OF THE INVENTION

Cloud computing provides a shared pool of configurable computing resources (e.g., computer networks, servers, storage, applications and services) that can be rapidly provisioned and released with minimal management effort. Cloud computing allows users with various capabilities to store and process their data in either a private cloud or public cloud (third-party owned) in order to make data accessing mechanisms much more easy and reliable. Large-scale cloud computing infrastructure and services are often provided by cloud providers that maintain data centers that may be located long distances from many of the users.

Cloud networks are widely used for large-scale data backup operations by enterprises that process large amounts of data on a regular basis, such as weekly or daily company-wide backups. Data deduplication is a form of single-instance storage that eliminates redundant copies of data to reduce storage overhead. Data compression methods are used store only one unique instance of data by replacing redundant data blocks with pointers to the unique data copy. As new data is written to a system, duplicate chunks are replaced with these pointer references to previously stored data. Though storage requirements are greatly reduced, processing overhead is increased through the compression processes of deduplication.

During heavy network traffic sessions, such as large-scale data migration on the cloud, the network throughput and IOPS (Input/Output Operations Per Second) can fluctuate significantly based on various factors at the cloud provider's end and the intermediate network. For instance, present known cloud providers can cause excessive retries during heavy usage. Even in private clouds, an excessive amount of load on the cloud provider's load balancer can lead to slow down and eventually errors prompting the sender to slow down data traffic. A cloud provider may also rate-limit incoming requests in order to honor the SLAs (service level agreements) for all users. Given these conditions, having a static number of connections would mean underutilizing the bandwidth available or having to perform excessive retries when communicating with the cloud provider. In present systems, network timeouts or errors from the cloud provider forces a retry all the requests using an exponential back-off interval. Since the number of connections is not reduced in this case, the cloud provider can continue to be overwhelmed by the high request rate. Under such conditions retrying after backing off typically does not help and subsequent retry attempts have a higher likelihood of failing.

What is needed, therefore, is a system and method that maximizes network throughput in cloud networks by dynamically tuning the number of connections used during data transfer with the cloud provider.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software development and deployment in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
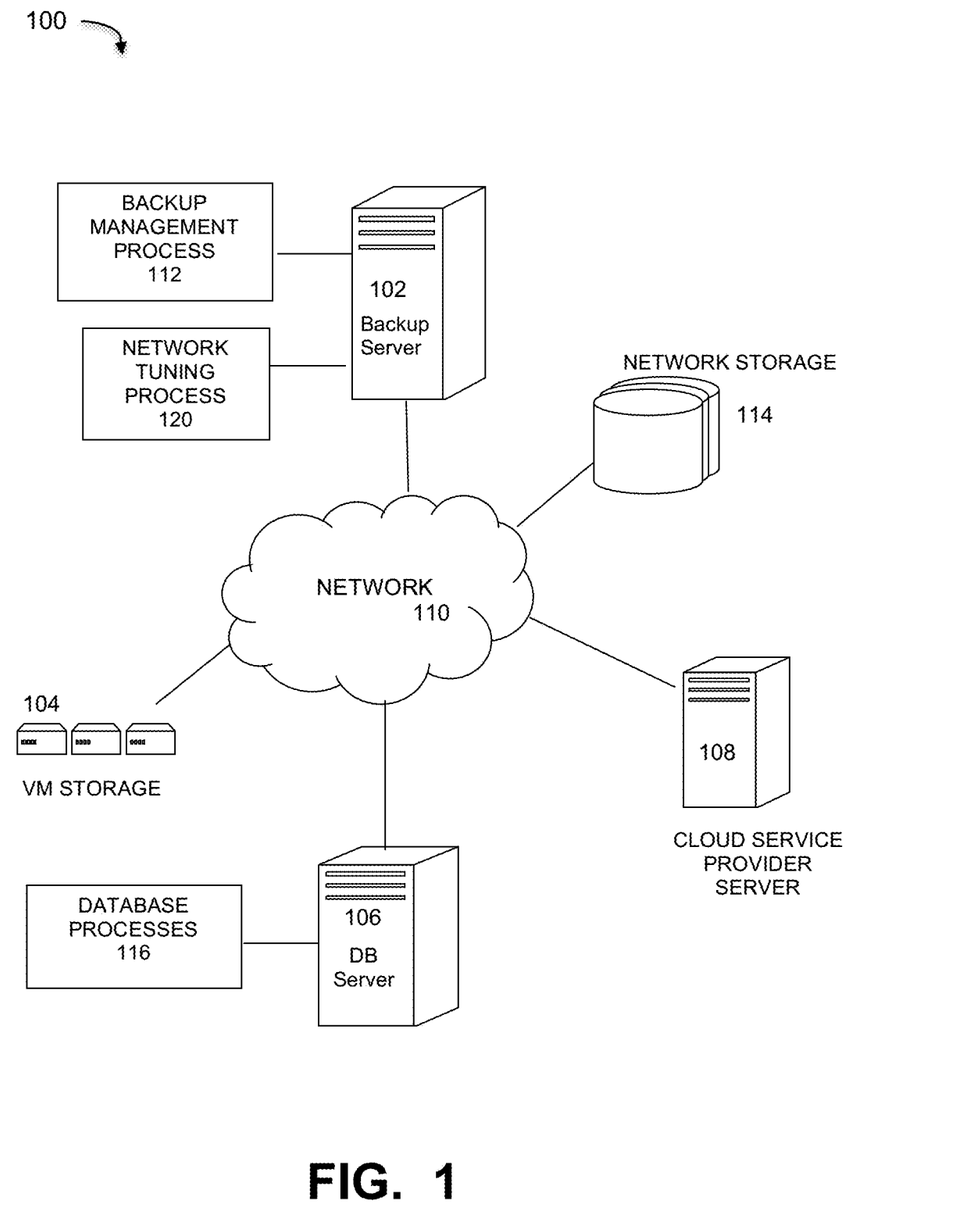
FIG. 1 is a diagram of a cloud computing network implementing a network tuning process for large-scale data transfers, under some embodiments.

Embodiments are described for a network tuning process for maximizing network throughput in deduplication backup systems, such as when performing data migration, in cloud network systems. FIG. 1 illustrates a computer network system that implements one or more embodiments of a cloud computing network implementing a network tuning process, under some embodiments. In system 100, a backup server 102 executes a backup management process 112 that coordinates or manages the backup of data from one or more data sources 108 to storage devices, such as network storage 114, client storage 106, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, such as backup server 102, in the network environment.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

In an embodiment, cloud network 110 may be a private network or it may be a public network provided by a third-party cloud service provider (CSP). In this case, at least part of the infrastructure of network 110, such as servers, routers, interfaces and so on are provided to users such as backup server 102 as an IaaS (Infrastructure as a Service), SaaS (Software as a Service), PaaS (Platform as a Service), or other type of arrangement. CSP's typically provide service under a service level agreement (SLA) that establishes the terms and costs to use the network and transmit/store data specifies minimum resource allocations (e.g., storage space) and performance requirements (e.g., network bandwidth) provided by the provider. The SLA may specify precise levels of service (e.g., 99.9% uptime) and any compensation that the user is entitled to should the provider fail to provide the service as described. The cloud provider 108 may be any company such as Amazon, EMC, Apple, Cisco, Citrix, IBM, Google, Microsoft, Salesforce.com, and so on. Depending on implementation, each cloud provider may show up as a cloud tier inside the file system for the user, such as the Data Domain file system. The cloud tier will have one or more cloud units that are used for data migration and storage using migration, copying, duplication, long-term retention (LTR), and other processes.

The data generated or sourced by system 100 and transmitted over network 110 may be stored in any number of persistent storage locations and devices, such as local client storage, server storage (e.g., 118). In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. The data sourced by the data source may be any appropriate data, such as database data that is part of a database management system, and the data may reside on one or more hard drives (e.g., 118) for the database(s) in a variety of formats. In an embodiment, system 100 may represent a Data Domain Restorer (DDR)-based deduplication storage system, and storage server 128 may be implemented as a DDR Deduplication Storage server provided by EMC Corporation. However, other similar backup and storage systems are also possible.

In cloud-based environments, different cloud providers have different data centers, limits and operating parameters, such as IOPS, request limits, and so on. The number of connections is not fixed among cloud providers or even within each cloud provider. Despite SLA requirements, users cannot always assume that a cloud provider will always provide a certain number of connections. As stated above, during heavy data transfer use, network throughput and IOPS can fluctuate significantly based on various factors at the CSP and the network 110. Such heavy loading can force request retries, which slow down network traffic through error protocols. As shown in FIG. 1, system 100 includes a network tuning process component 120 executed by backup server 102 or any other user of system 100 to maximize network throughput during data transfer between a deduplication appliance and the cloud provider. This processing component manages and maximizes network throughput by dynamically tuning the number of connections used during data transfer with the cloud provider 108 or various cloud providers, depending on the system topography. This adaptive tuning of the network connections is based on several factors, such as the accepted request rate for the cloud provider, the outstanding transfer capacity (derived from the network bandwidth), errors and retry requests from the network and the cloud provider.

Figure 2:
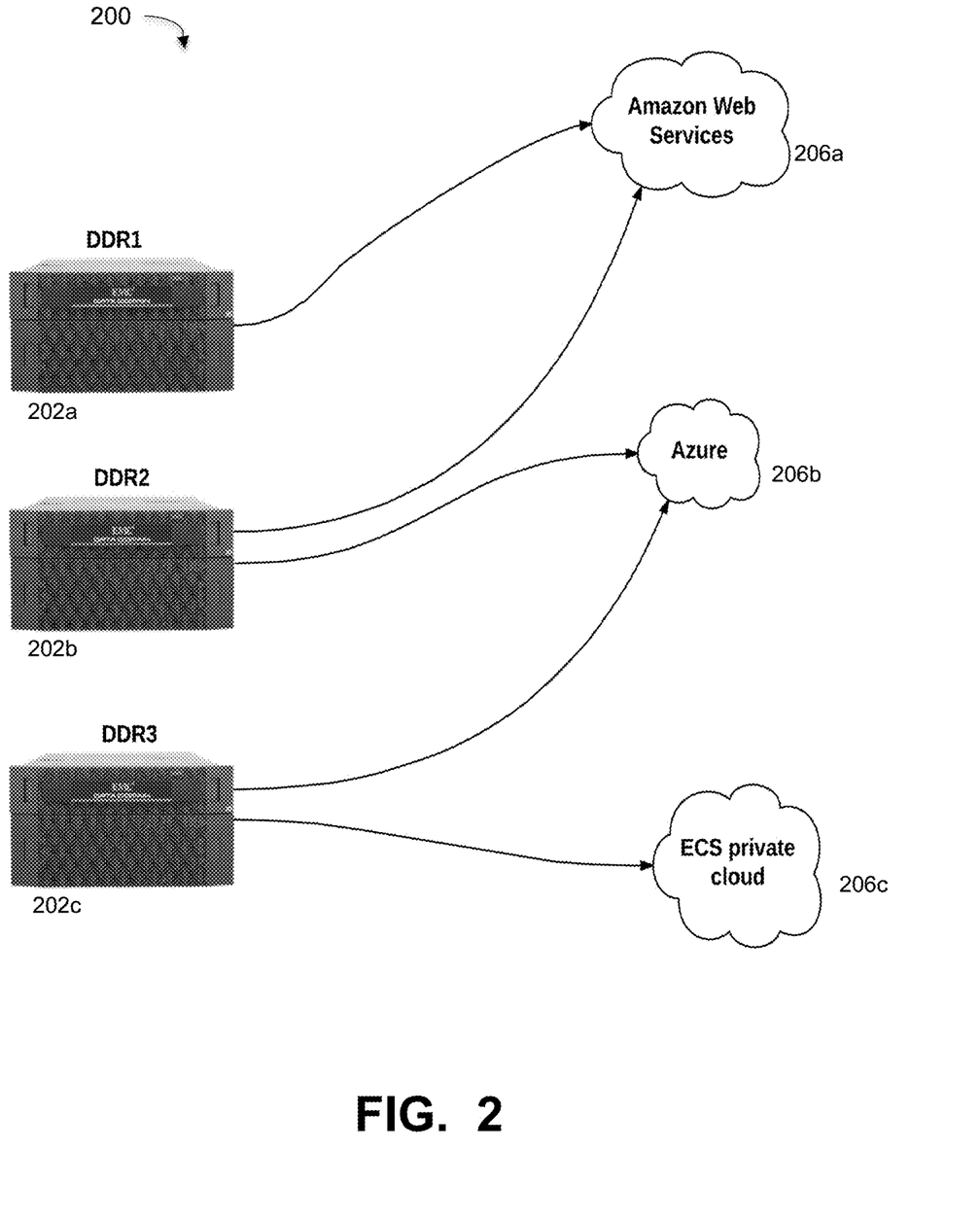
FIG. 2 is a general block diagram that illustrates a networking of data deduplication appliances with cloud providers, under some embodiments.

FIG. 2 is a general block diagram that illustrates a networking of data deduplication appliances with cloud providers, under some embodiments. Diagram 200 illustrates a system having a number of backup appliances 202a-c coupled to various cloud providers 206a-c. The appliances 202 may be data domain deduplication appliances (DDR) as shown in FIG. 2, or any other appropriate backup machine or server component. The cloud providers may be any CSP, such as Amazon 206a and Azure 206b as shown, or any other public or private cloud provider. As shown in the example of FIG. 2, appliance DDR1 202a is connected to the Amazon Web Services (AWS) cloud, DDR2 202b is connected to both the AWS and Azure public clouds, and DDR 3 202c is connected to a private cloud provider (ECS) 206c. In an embodiment, each DDR runs its own network tuning process 120. This process acts to throttle the input/output (I/O) of each cloud provider to minimize data request retries and maximize throughput for a given amount of network traffic. The respective tuning processes are performed independently of each other on each appliance, and hence any slowdown for one CSP does not impact any other CSP.

In general, I/O throttling is required due to fluctuations in network throughput and IOPS at the cloud provider. Such fluctuation can cause significant limitations in network bandwidth that can cause the cloud provider to not deliver service at the level of the SLAs for the users. Several factors can contribute to these fluctuations, such as usage or load variances due to known factors, the amount of data transmitted to the cloud at any one instance, and other similar factors. When the cloud provider is faced with excessive traffic conditions, it typically performs an exponential backoff process that spaces out repeated retransmissions of the same block of data to alleviate network congestion.

In an embodiment, the network tuning process for each appliance (or other server) decreases (tunes down) the number of connections to the cloud provider or cloud providers to which it is attached, based on an error percentage. Similarly, it will also progressively increase the number of connections when there are no errors. When the number of connections is tuned down it will result in fewer outstanding requests, increasing the likelihood of success for those requests. This will help maintain a consistent throughput, once a steady state is reached. The tuning process 120 is a greedy algorithm meaning that it will try and achieve the maximum throughput without incurring any exponential backoff and slow startup penalties.

Figure 3:
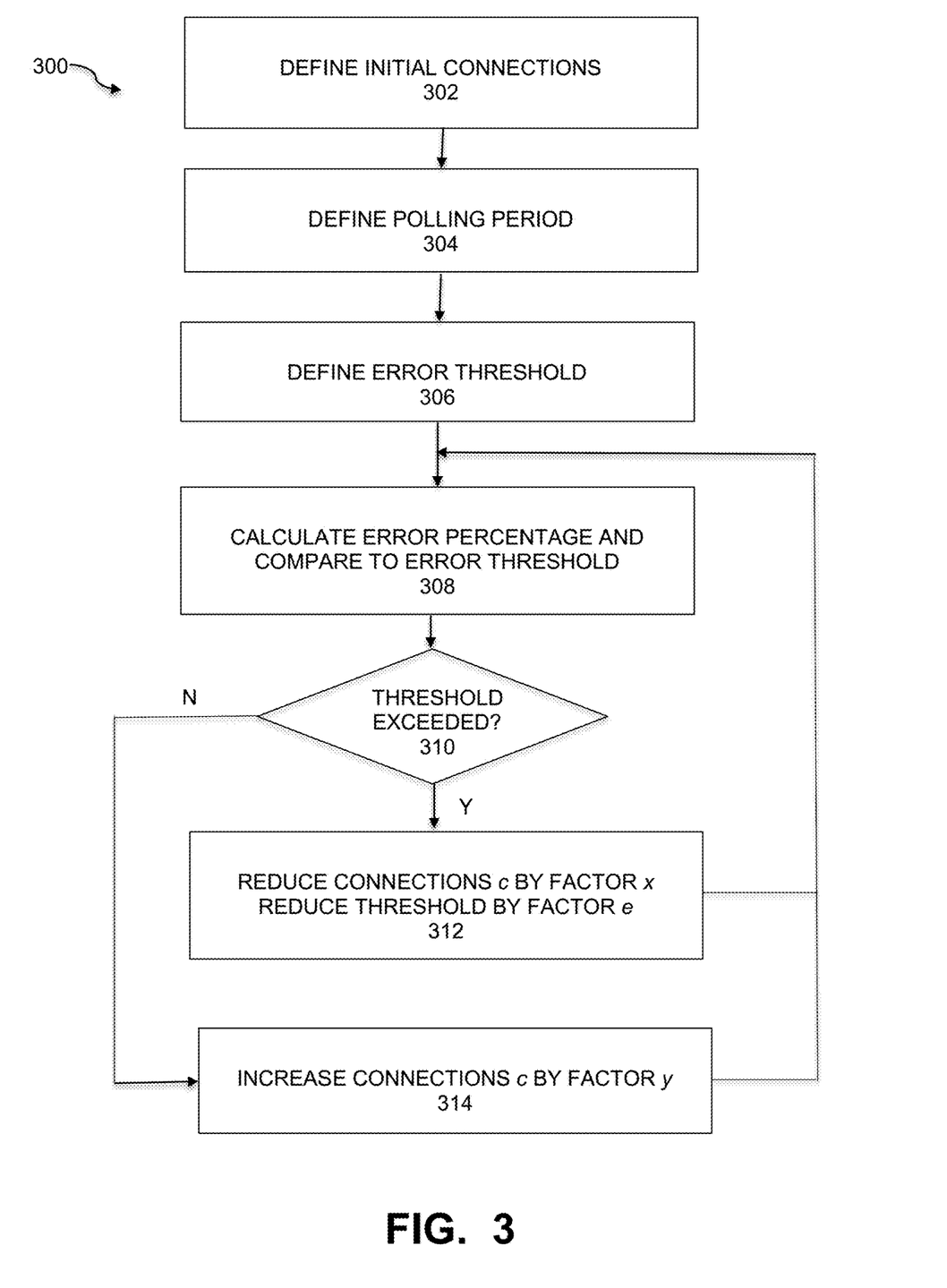
FIG. 3 is a flowchart illustrating a network tuning algorithm used in a network tuning process, under some embodiments.

FIG. 3 is a flowchart illustrating a network tuning algorithm used in a network tuning process, under some embodiments. The process 300 starts with defining an initial fixed number of connections (c) communicating between a server or appliance with a cloud provider, step 302. A polling period (t) in seconds is also defined to establish polling intervals during which sample connections are measured, step 304. In step 306, an error threshold is defined to establish a baseline against which network errors for the connections are measured.

In each polling interval, the process calculates the error percentage and compares it to the defined threshold, step 308. If, in decision block 310, it is determined that the error percentage is greater than the defined threshold value, the number of connections is reduced by a factor x with a floor value of $c_0$. The reduction in the number of connections is calculated as follows: reduction=c/x. At the same time, the process also reduces the error threshold by an error factor (e) so that it can react faster to subsequent errors, step 312. The error percentage for this new number of connections is calculated and then compared to the new error threshold, and tested for exceeding the new threshold, step 310. This proceeds until the threshold is not exceeded, at which point the process proceeds from step 314. As shown in this step, if there are a number (n) of subsequent polling intervals without errors, the number connections are increased by a factory. The error percentage for this increased number of connections is compared to the last previously established or defined threshold in step 308. An excessive increase will cause the error threshold to be exceeded, at which point the process will back off and use the maximum number of connections that does not cause an excessive amount of errors. This process of FIG. 3 is adaptive and the back off (reduction) factors (x) and ramp up (increase) factors (y) are adaptive to the cloud provider type.

In an embodiment, the network tuning process 120 employs an error throttling algorithm that uses a connection pool that maintains the pool of active connections to a given cloud provider. This connection pool is sized based on a system parameter which is variable for each cloud provider. The throttling algorithm modifies the number of active connections at any point in time. The range of the connections can vary over a defined range, such as from 32 to 1024 which are tunable values provided to the system. In an example configuration, the connection pool size is initialized to 128, or some alternative value. Likewise, there is an error tolerance percentage which is initialized to, for example, 1% and can vary from 0.05 to 2%. The connection pool is sampled once every two seconds, or other similar periods. During this time, the process keeps track of the number of errors, successes, and the total number of active requests. It computes the request rate and the error percentage during this sample interval. If there are no errors in the sampled interval, this is treated as a clean run and increments a clean run counter (clean_run_cnt). If there are a defined number (e.g., 30) consecutive clean runs, it increments the number of allowed connections by 128 and the error tolerance percentage by 0.25%. If there are errors in the sampled interval and the request rate is high enough (around 100 requests per second) to need throttling, the process checks if the error percentage exceeds the tolerance percentage. If it exceeds this percentage, the process throttles down the number of active connections. At the same time, it decreases the tolerance percentage so further errors are detected faster. In general, the throttling down procedure is swift (divided by half) and the throttling up is done gradually (by adding increments) to allow the system to recover from errors by releasing the throttle gently.

Figure 4:
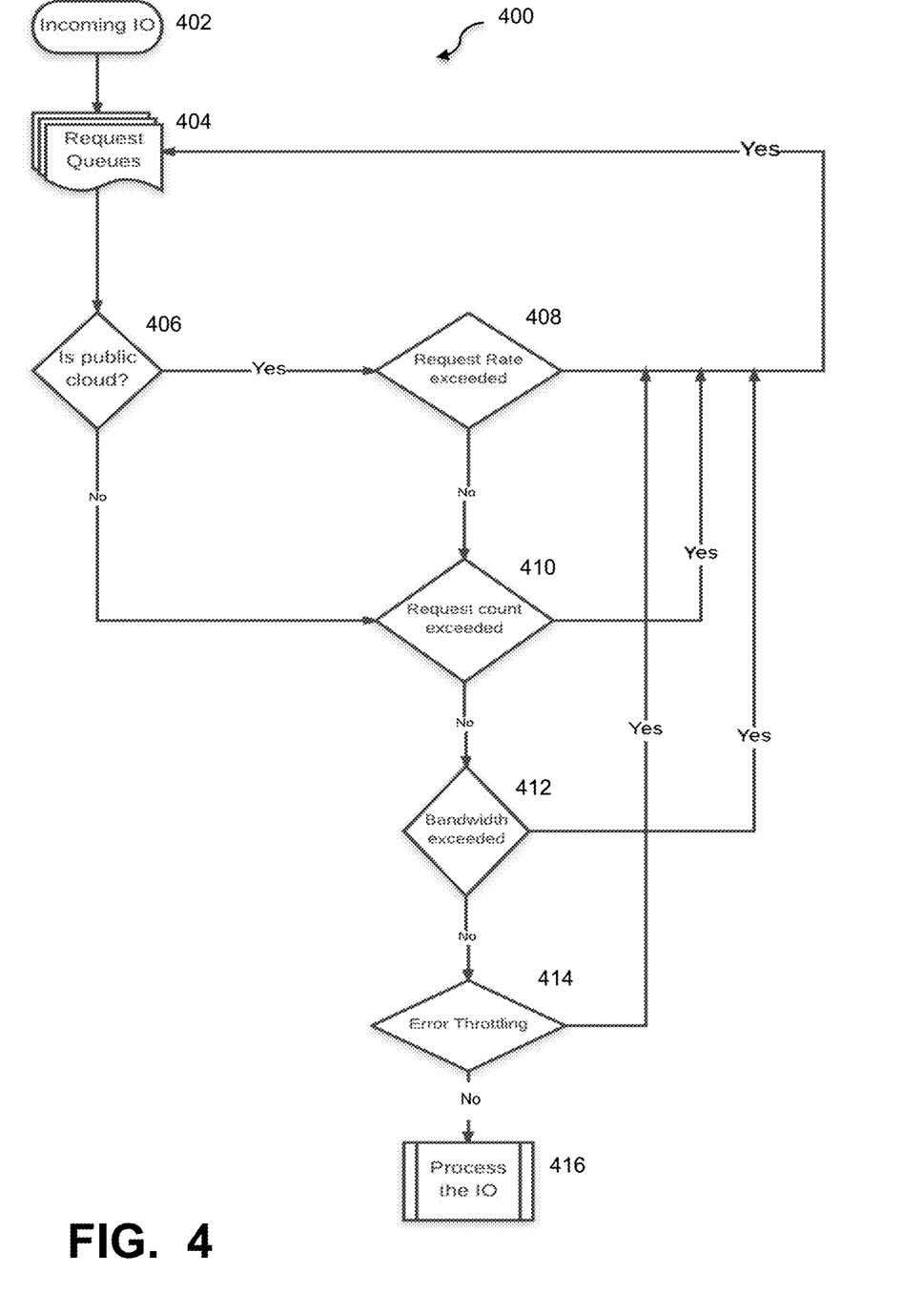
FIG. 4 is a flowchart that illustrates a method of performing network tuning, under some embodiments.

In an embodiment, the rate of I/O processing for a user by the cloud provider is adaptive based on the rate of requests and the bandwidth of the CSP network. Every read or write I/O request has a payload and the payload size could vary from 64 KB to 4.5 MB, for example. Process 120 computes the outstanding bytes by multiplying outstanding requests with the payload of each request. This is compared with available network bandwidth, where the network bandwidth setting is input to system by a tunable value. The network tuning process 120 thus provides a tunable request rate based on the bandwidth of the cloud network. FIG. 4 is a flowchart that illustrates a method of performing network tuning, under some embodiments. As shown in process 400 of FIG. 4, incoming I/O 402 is organized into request queues 404. A first determination 406 is made as to whether the requests are made to a public cloud or private cloud provider. A public cloud may have a maximum number of requests per second (request rate) recommended by the cloud provider, while a private cloud may not have any such maximum request recommendation. So, if the cloud is public, the process determines whether or not the request rate is exceeded, block 408, otherwise for a private cloud, the process proceeds from block 410. If, for a public cloud, the request rate is not exceeded or if the cloud is private, the process next determines whether or not the request count is exceeded, 408. The request count is the number of requests of a particular type, such as put/get/delete.

If the request count is not exceeded, the process next determines in decision block 412, whether or not the bandwidth is exceeded. The bandwidth represents the transfer capacity of the cloud network. If the bandwidth is not exceeded, the process determines whether or not there is any error throttling, 414. Error throttling occurs when there is a push back from the cloud provider. In an embodiment, the error throttling process is performed as shown in process 300 of FIG. 3, but embodiments are not so limited. If there is no error throttling, then the I/O is processed, block 416. As shown in FIG. 4, if at any point there is error throttling 416, excessive bandwidth 412, excessive request count 410, or excessive request rate 408, the process iterates back to the request queues 404. The I/O is thus processed only when the bandwidth and request rate and counts are not exceeded, and there is no error throttling.

The processes of FIGS. 3 and 4 as implemented in a network tuning component 120 thus provide a system and method for maximizing network throughput by dynamically tuning the number of connections used during data transfer with a cloud provider or several cloud providers. The adaptive tuning of the network connections is based on the accepted request rate for the cloud provider, the bandwidth (outstanding transfer capacity) of the cloud network, and errors and retry requests from the network and the cloud provider.

System Implementation

Embodiments of the processes and techniques described above can be implemented on any appropriate backup system operating environment or file system, or network server system. Such embodiments may include other or alternative data structures or definitions as needed or appropriate.

Figure 5:
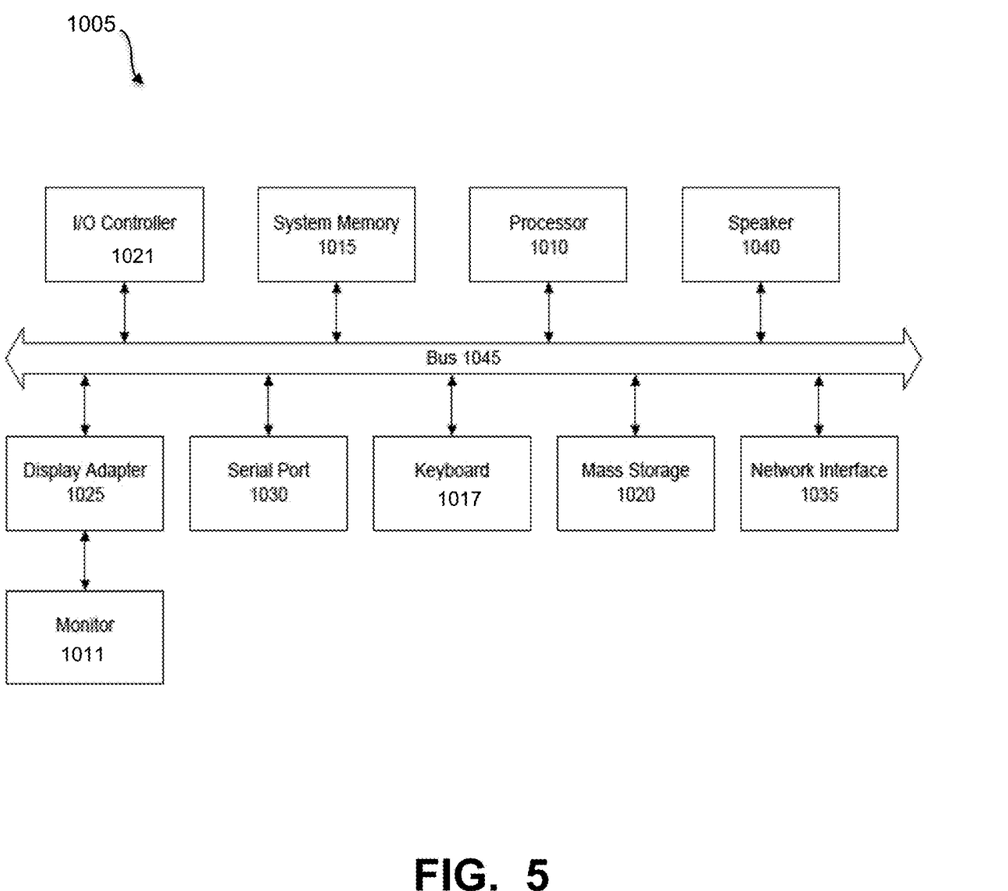
FIG. 5 is a system block diagram of a computer system used to execute one or more software components of the network tuning process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 5 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 5 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method comprising:
   organizing incoming input/output (I/O) requests from a user computer to a public cloud network maintained by a cloud service provider (CSP) into a plurality of request queues;
   determining, for a request in a request queue, if a request count is exceeded, and if not, then determining if a bandwidth of the cloud network is exceeded;
   determining, if the bandwidth is not exceeded, whether or not error throttling is performed, and if not, then processing the request; and
   processing a next request from the request queue if any of the request count and the bandwidth is exceeded or if the error throttling is performed;
   determining whether or not a request rate recommended by the cloud service provider is exceeded; and
   processing the next request if the request rate recommended is not exceeded, otherwise proceeding to the step of determining if the request count is exceeded, and wherein the error throttling comprises a push back error of the request from the CSP, and further comprises:
   defining an initial number of connections, a polling period, and an error threshold;
   calculating an error percentage during the polling period for the defined initial number of connections communicated to the CSP;
   reducing, if the calculated error percentage is greater than the error threshold, the initial number of connections by a first connection factor, and the error threshold by an error factor;
   increasing, if the defined initial number of subsequent polling periods has no errors, the initial number of connections by a second connection factor; and
   recalculating the calculated error percentage for the increased number of connections, and iterating through the recalculated error percentage calculation and connection reduction steps until the error threshold is not exceeded.

2. The method of claim 1 wherein the request rate recommended comprises a maximum number of requests per second recommended by the CSP.

3. The method of claim 1 wherein the bandwidth comprises an outstanding transfer capacity of the cloud network as provided by the CSP.

4. The method of claim 1 wherein the request count comprises a number of requests of a particular type, including a put, get, or delete command.

5. The method of claim 1 wherein the user computer comprises a deduplication backup server running a Data Domain file system (DDFS), and wherein the request comprises at least part of a large-scale data transfer operation.

6. A system comprising:
   a processor coupled to a memory;
   a plurality of request queues storing incoming input/output (I/O) requests from a user computer to a public cloud network maintained by a cloud service provider (CSP) into the plurality of request queues;
   a first processing component determining, for a request in the plurality of request queues, if a request count is exceeded, and if not, then determining if a bandwidth of the cloud network is exceeded, and determining, if the bandwidth is not exceeded, whether or not error throttling is performed, and if not, then processing the request; and
   a second processing component processing a next request from the plurality of request queues if any of the request count and the bandwidth is exceeded or if the error throttling is performed, and wherein the first processing component further determines whether or not a request rate recommended by the cloud service provider is exceeded and processes the next request if the request rate is not exceeded, or otherwise determines if the request count is exceeded, and the request rate comprises a maximum number of requests per second recommended by the CSP, the bandwidth comprises an outstanding transfer capacity of the cloud network as provided by the CSP, and the request count comprises a number of requests of a particular type, including a put, get, or delete command, wherein the error throttling comprises push back error of the request from the CSP, and further comprising an error throttling component;
   defining an initial number of connections, a polling period, and an error threshold; calculating an error percentage during the polling period for the initial number of connections communicated to the CSP;
   reducing, if the error percentage is greater than the error threshold, the initial number of connections by a first connection factor, and the error threshold by an error factor; and
   increasing, if defined number of subsequent polling periods has no errors, the initial number of connections by a second connection factor, wherein the error throttling component further recalculates the error percentage for the increased number of connections; and iterates through the error percentage calculation and connection reduction until the error threshold is not exceeded.

7. The system of claim 6 wherein the user computer comprises a deduplication backup server running a Data Domain file system (DDFS), and wherein the request comprises at least part of a large-scale data transfer operation.

8. A computer program product, comprising a non-transitory computer-readable medium having a computer-readable program code embodied therein, the computer-readable program code adapted to be executed by one or more processors to implement a method by:

organizing incoming input/output (I/O) requests from a user computer to a cloud network maintained by a cloud service provider (CSP) into a plurality of request queues;

determining, for a request in a request queue, if a request count is exceeded, and if not, then determining if a bandwidth of the cloud network is exceeded;

determining, if the bandwidth is not exceeded, whether or not error throttling is performed, and if not, then processing the request; and     processing a next request from the request queue if any of the request count and bandwidth is exceeded or if error throttling is performed, wherein the error throttling of the method comprises     defining an initial number of connections, a polling period, and an error threshold;

calculating an error percentage during the polling period for the initial number of connections communicated to the CSP;

reducing, if the error percentage is greater than the error threshold, the initial number of connections by a first connection factor, and the error threshold by an error factor;

increasing, if defined number of subsequent polling periods has no errors, the initial number of connections by a second connection factor;

recalculating the error percentage for the increased number of connections; and     iterating through the error percentage calculation and connection reduction steps until the error threshold is not exceeded.

\* \* \* \* \*